(12) United States Patent
Murase

(10) Patent No.: US 8,439,144 B2
(45) Date of Patent: May 14, 2013

(54) ELECTRIC VEHICLE

(75) Inventor: Takashi Murase, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 332 days.

(21) Appl. No.: 12/631,893

(22) Filed: Dec. 7, 2009

(65) Prior Publication Data

US 2010/0147612 A1  Jun. 17, 2010

(30) Foreign Application Priority Data

Dec. 12, 2008 (JP) ................................. 2008-008733

(51) Int. Cl.
*B60R 16/04* (2006.01)

(52) U.S. Cl.
USPC ........................................ 180/68.5; 180/65.1

(58) Field of Classification Search .................. 180/68.5, 180/65.1, 908; 429/97; 105/51; 16/252; 269/27; 296/146.11
See application file for complete search history.

(56) References Cited

U.S. PATENT DOCUMENTS

| 4,534,547 | A * | 8/1985 | Cox ............................... 269/182 |
| 4,991,674 | A * | 2/1991 | Fullenkamp ................. 180/68.5 |
| 6,732,825 | B2 * | 5/2004 | Takeda ........................ 180/68.5 |
| 7,014,002 | B2 * | 3/2006 | Mizuta ......................... 180/68.5 |
| 7,398,848 | B2 * | 7/2008 | Kondo .......................... 180/68.5 |
| 7,455,137 | B2 * | 11/2008 | Magsaam .................... 180/68.5 |
| 7,712,563 | B2 * | 5/2010 | Niebuhr ....................... 180/68.5 |
| 2002/0066609 | A1 * | 6/2002 | Dignitti et al. .............. 180/68.5 |
| 2004/0079570 | A1 * | 4/2004 | Mizuta ......................... 180/68.5 |
| 2005/0092536 | A1 * | 5/2005 | Takeda ........................ 180/68.5 |
| 2008/0006459 | A1 * | 1/2008 | Niebuhr ....................... 180/68.5 |
| 2008/0314662 | A1 * | 12/2008 | Bogelein et al. ............ 180/68.5 |

FOREIGN PATENT DOCUMENTS

| DE | 20 2008 012 144 U1 | 1/2009 | |
| EP | 2 006 145 A2 | 12/2008 | |
| JP | 58022298 | * | 2/1983 |
| JP | 58-169665 U | | 11/1983 |
| JP | 63-137459 A | | 6/1988 |
| JP | 63-137459 U | | 9/1988 |
| JP | 04-067562 A | | 3/1992 |
| JP | 05-069870 A | | 3/1993 |
| JP | 2000-357498 A | | 12/2000 |
| JP | 2000357498 A | * | 12/2000 |
| JP | 2004253180 | * | 9/2004 |
| JP | 2005075061 | * | 3/2005 |
| JP | 2005082397 A | * | 3/2005 |
| JP | 2009-091091 A | | 4/2009 |

\* cited by examiner

*Primary Examiner* — Katy M Ebner
*Assistant Examiner* — Emma K Frick
(74) *Attorney, Agent, or Firm* — Sughrue Mion, PLLC

(57) ABSTRACT

An electric vehicle includes a vehicle frame, a frame connector, a battery compartment, a battery stopper and an anti-connection portion. The battery compartment is provided for receiving a battery unit which has a cable connector connected thereto by a power cable. The battery stopper is mounted to the vehicle frame and movable between a closed position where the battery unit is stopped from removing and an open position where the battery unit is removable. The anti-connection portion is provided on the battery stopper. When the battery stopper is placed in the open position, the anti-connection portion is located at an anti-connection position thereby to prevent the cable connector from being connected to the frame connector. When the battery stopper is placed in the closed position, the anti-connection portion is spaced away from the anti-connection position thereby to allow the cable connector to be connected to the frame connector.

8 Claims, 4 Drawing Sheets

ELECTRIC VEHICLE

BACKGROUND OF THE INVENTION

The present invention relates to an electric vehicle such as battery-powered forklift truck.

A battery-powered forklift truck is disclosed by Japanese Unexamined Patent Application Publication No. 2000-357498. The battery-powered forklift truck includes a battery unit which is mounted on and removed from the vehicle frame by sliding, a battery stopper which stops the battery unit from sliding out of a battery compartment, a cable connector which is provided at one end of a power cable extending from the battery unit, and a frame connector which is provided in the vehicle frame and to which the cable connector is connected. The battery stopper is pivotally mounted to the vehicle frame. The battery stopper is pivotable between the closed position where the battery unit is stopped from sliding out of the battery compartment and the open position where the battery unit is slidable out of the battery compartment. When the battery stopper is in the closed position, the battery stopper is prevented from pivoting by a locking pin. The locking pin is rendered inoperable by a restriction member provided on the cable connector. Therefore, the locking pin cannot be released unless the cable connector is removed from the frame connector. The battery unit is prevented from sliding out of the battery compartment of the vehicle frame in the event when removing the cable connector from the frame connector is neglected. Thus, the power cable is prevented from being damaged due to the slide.

An automatic guided vehicle is disclosed by Japanese Utility Model Application Publication No. 63-137459, which includes a pin that is movable in and out of a frame connector, a stopper that is movable in and out of the vehicle frame, and an interlock mechanism that interlocks the operation of the pin and the stopper. When a cable connector is connected to the frame connector, the pin is pushed into the frame connector by the cable connector. In conjunction with such movement of the pin, the stopper is moved out toward the battery unit thereby to prevent the battery unit from being dropped out of the vehicle frame.

According to Japanese Unexamined Patent Application Publication No. 2000-357498, however, the cable connector is connectable to the frame connector with the battery stopper placed in the open position. In this case, the forklift truck may be driven to run with the battery stopper placed in the open position, with a fear that the battery unit may be dropped out of the vehicle frame. Although the automatic guided vehicle of Japanese Utility Model Application Publication No. 63-137459 has no such fear, the vehicle requires a large number of parts, which makes the structure of the vehicle complicated.

The present invention is directed to an electric vehicle which is prevented from running with the battery stopper placed in the open position and is simple in structure.

SUMMARY OF THE INVENTION

In accordance with the present invention, there is provided an electric vehicle that includes a vehicle frame, a frame connector, a battery compartment, a battery stopper and an anti-connection portion. The frame connector is provided on the vehicle frame. The battery compartment is provided for receiving a battery unit which has a cable connector connected thereto by a power cable. The battery unit is removable from the battery compartment in a horizontal direction. The cable connector is connectable to the frame connector. The battery stopper is mounted to the vehicle frame for stopping the battery unit in the battery compartment from removing. The battery stopper is movable between a closed position where the battery unit is stopped from removing and an open position where the battery unit is removable. The anti-connection portion is provided on the battery stopper. When the battery stopper is placed in the open position, the anti-connection portion is located at an anti-connection position thereby to prevent the cable connector from being connected to the frame connector. When the battery stopper is placed in the closed position, the anti-connection portion is spaced away from the anti-connection position thereby to allow the cable connector to be connected to the frame connector.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
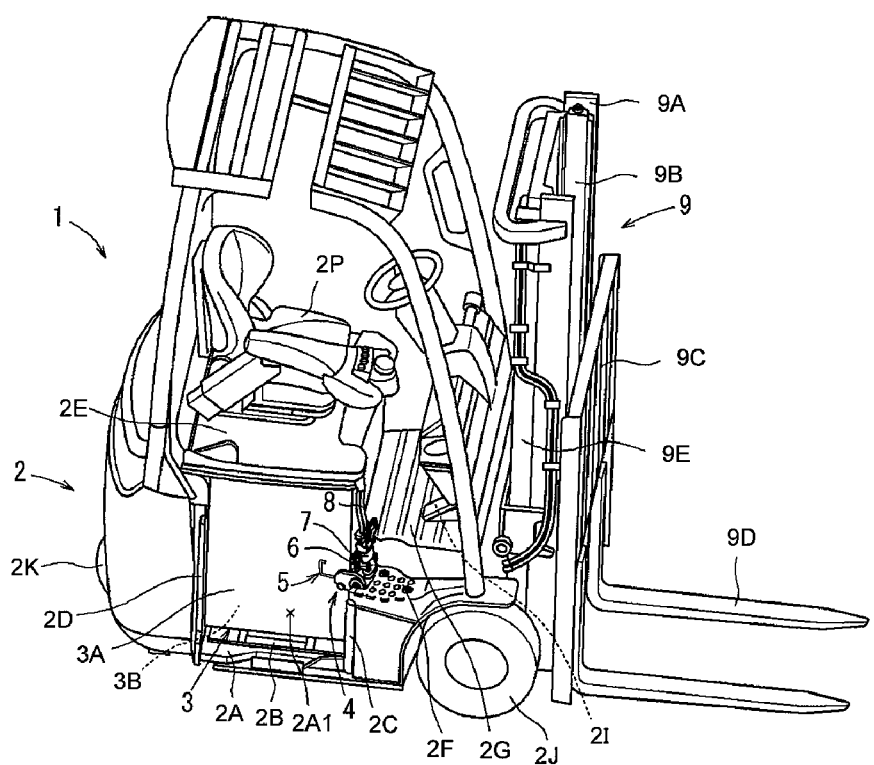
FIG. 1 is a perspective view showing a battery-powered forklift truck according to a preferred embodiment of the present invention.
Figure 2:
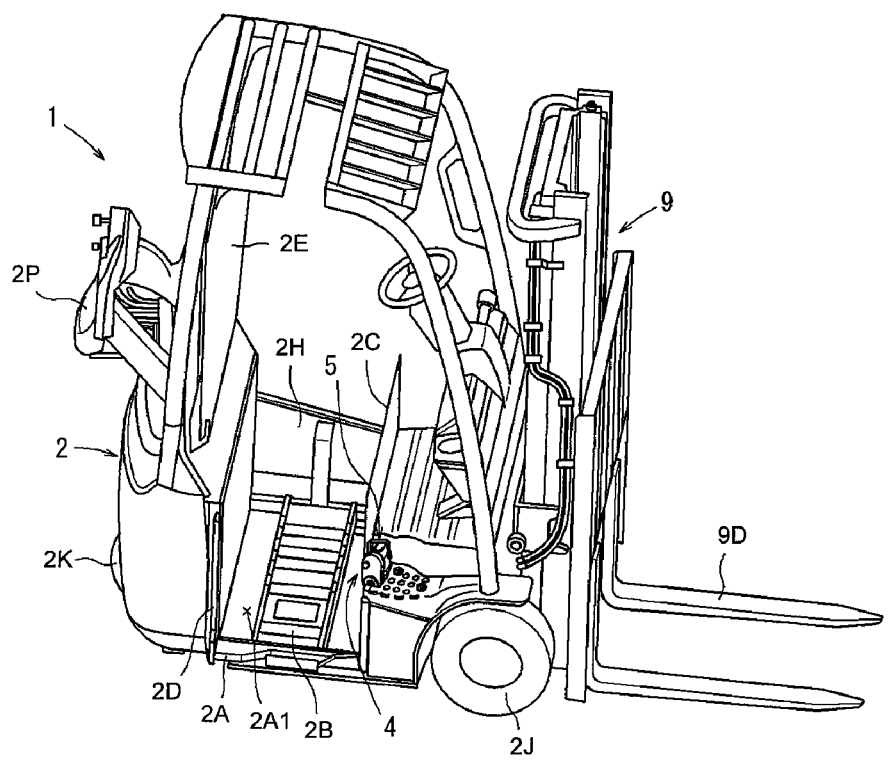
FIG. 2 is a perspective view showing the battery-powered forklift truck of FIG. 1 wherein a battery unit is removed for the sake of illustration.

The following will describe the electric vehicle according to the preferred embodiment of the present invention as applied to a battery-powered forklift truck 1 with reference to FIGS. 1 through 6. Referring to FIGS. 1 and 2, the battery-powered forklift truck 1 includes a vehicle frame 2, a battery unit 3 and a loading implement 9. The battery unit 3 is housed in a battery compartment 2A formed in the vehicle frame 2 substantially at the middle as viewed in longitudinal direction of the truck 1. The battery unit 3 is mounted in and removed out from the battery compartment 2A in a horizontal direction. A battery stopper 4 is mounted to the vehicle frame 2 for stopping the battery unit 3 from sliding out of the battery compartment 2A. The battery unit 3 and the vehicle frame 2 are connected electrically to each other through a pair of power cables 8 extending from the battery unit 3, a cable connector 7 provided at one end of the power cables 8, and a frame connector 6 which is provided on the vehicle frame 2 and to which the cable connector 7 is connected.

As shown in FIGS. 1 and 2, the vehicle frame 2 has a pair of front wheels 2J as drive wheels, a rear wheel 2K as a steerable wheel, and a drive motor 2I. The drive motor 2I is provided in the interior of the vehicle frame 2 in the front thereof for driving to rotate the front wheels 2J by electric power supplied from the battery unit 3. The aforementioned battery compartment 2A has a front wall 2C, a rear wall 2D, a side wall 2H and an opening 2A1. The front wall 2C is located on the front side of the battery compartment 2A and the rear wall 2D is located on the rear side of the battery compartment 2A. The side wall 2H is located on the left side of the battery compartment 2A and the opening 2A1 is located on the right side of the battery compartment 2A.

Figure 4:
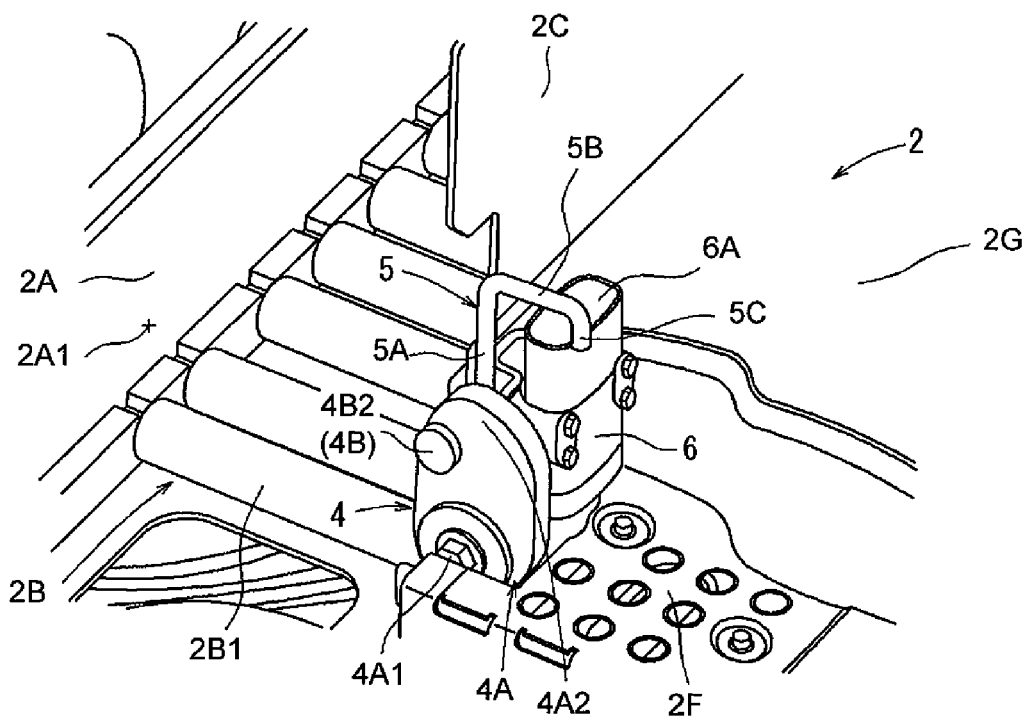
FIG. 4 is a fragmentary perspective view showing the battery stopper and its related parts, wherein the battery stopper is placed in its open position.

The battery unit 3 is mounted in the battery compartment 2A through the opening 2A1. The forward and rearward movement of the battery unit 3 in the battery compartment 2A is restricted by its front and rear walls 2C, 2D. The leftward movement of the battery unit 3 in the battery compartment 2A is restricted by the side wall 2H. As shown in FIGS. 2 and 4, a roller unit 2B is provided at the bottom of the battery compartment 2A for facilitating the sliding movement of the battery unit 3. The roller unit 2B has a plurality of rollers 2B1 juxtaposed in the direction in which the battery unit 3 is slid for installation in and removal from the battery compartment 2A.

As shown in FIGS. 1 and 2, the vehicle frame 2 has a battery hood 2E for covering the battery unit 3 and a driver seat 2P mounted on the battery hood 2E. The battery hood 2E is pivotally mounted at the rear thereof to the main body of the vehicle frame 2. The battery hood 2E is placed in its pivoted position in sliding the battery unit 3. The vehicle frame 2 has in the front thereof a platform 2G and a step 2F. The platform 2G is located forward of the front wall 2C of the battery compartment 2A for supporting the driver's feet. The step 2F is located on the lateral side of the platform 2G at a position that is lower than the platform 2G for helping the driver to get on and off the platform 2G.

As shown in FIG. 1, the battery unit 3 includes a battery case 3A and a plurality of batteries 3B that are disposed in the battery case 3A. The paired power cables 8 are connected at one end thereof to the battery unit 3 and the cable connector 7 is mounted to the other end of the paired power cables 8. The cable connector 7 has at the end thereof opposite from the paired power cables 8 a connection 7A which is connected to the frame connector 6. The cable connector 7 has at the other end thereof a handle 7B which is held and moved by the operator in connecting and disconnecting the cable connector 7 to and from the frame connector 6.

Figure 3:
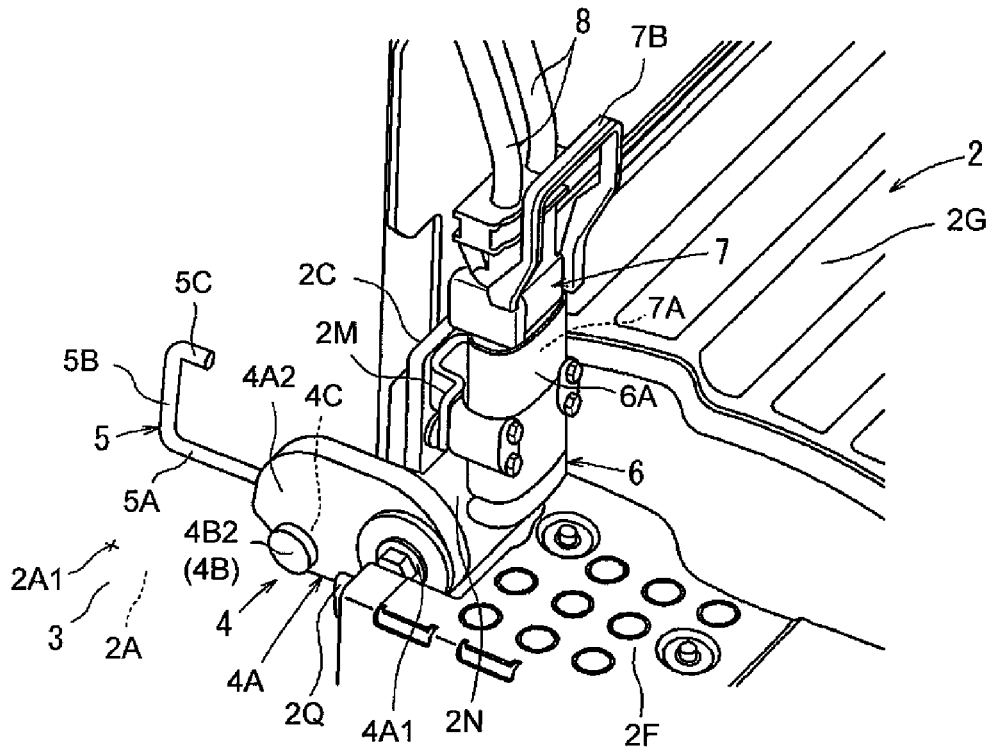
FIG. 3 is a fragmentary perspective view showing a battery stopper and its related parts, wherein the battery stopper is placed in its closed position.

As shown in FIGS. 3 and 4, the frame connector 6 is mounted to the vehicle frame 2 by way of a bracket 2M at a position that is forward of the front wall 2C. Thus, the frame connector 6 is immovably mounted to the vehicle frame 2 at a position adjacent to the opening 2A1 of the battery compartment 2A. The frame connector 6 extends upward from the rear of the step 2F and has at the top thereof a connection 6A with which the connection 7A of the cable connector 7 is engaged from above. A power cable (not shown) is connected at one end thereof to the bottom of the frame connector 6 and at the other end thereof to the electric component of the vehicle frame 2, such as the drive motor 2I and the loading implement 9.

As shown in FIG. 1, the loading implement 9 includes a pair of outer masts 9A, a pair of inner masts 9B and a lift 9E. The outer masts 9A are supported in upstanding position by the vehicle frame 2 at the front thereof, and the inner masts 9B are mounted to the outer masts 9A so as to be vertically movable relative to the outer masts 9A. A bracket 9C is mounted to the paired inner masts 9B and a pair of forks 9D is mounted on the bracket 9C. The lift 9E has hydraulic cylinders and chains. The hydraulic cylinders serve to move up and down the inner masts 9B in accordance with electric power supplied from the battery unit 3. Each chain is engaged at one end thereof with the outer mast 9A, connected at the other end thereof to the bracket 9C and engaged at the middle portion thereof with the top of the inner mast 9B. Thus, the bracket 9C is moved up and down together with the forks 9D by the lift 9E.

As shown in FIGS. 3 and 4, the battery stopper 4 is pivotally mounted to the vehicle frame 2. The battery stopper 4 includes a plate-like stopper body 4A having one end 4A1 thereof pivotally mounted to the frame member 2N of the vehicle frame 2. Thus, the stopper body 4A is pivotally mounted to the vehicle frame 2 at a position that is forward of the opening 2A1 of the battery compartment 2A and also adjacent to the frame connector 6. The stopper body 4A is pivotable between the closed position shown in FIG. 3 and the open position shown in FIG. 4.

Figure 5:
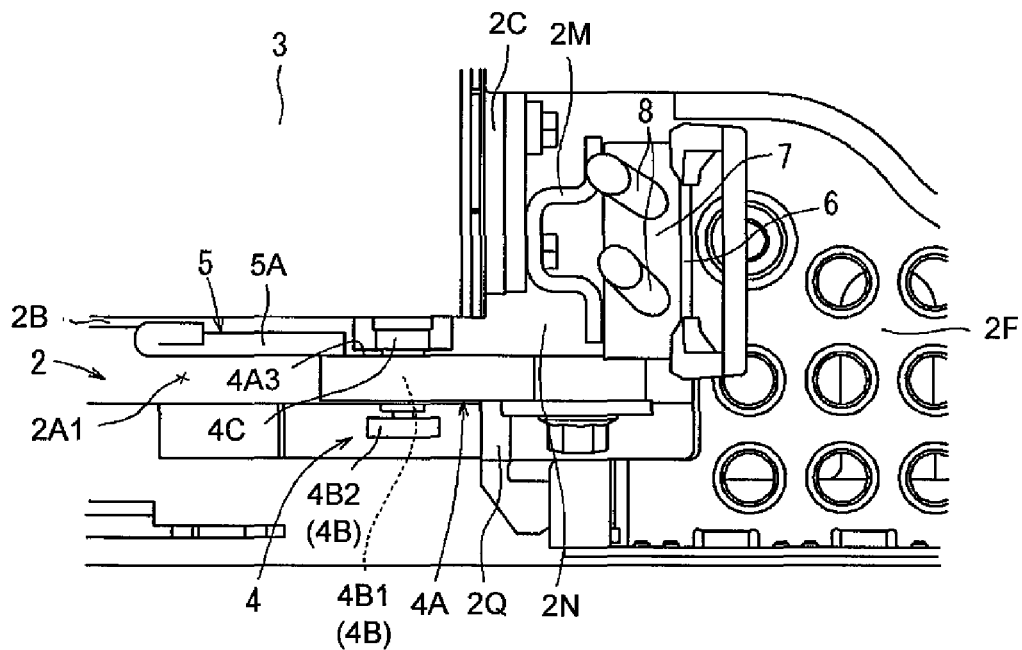
FIG. 5 is a fragmentary top view showing the battery stopper and its related parts, wherein the battery stopper is placed in the closed position.
Figure 6:
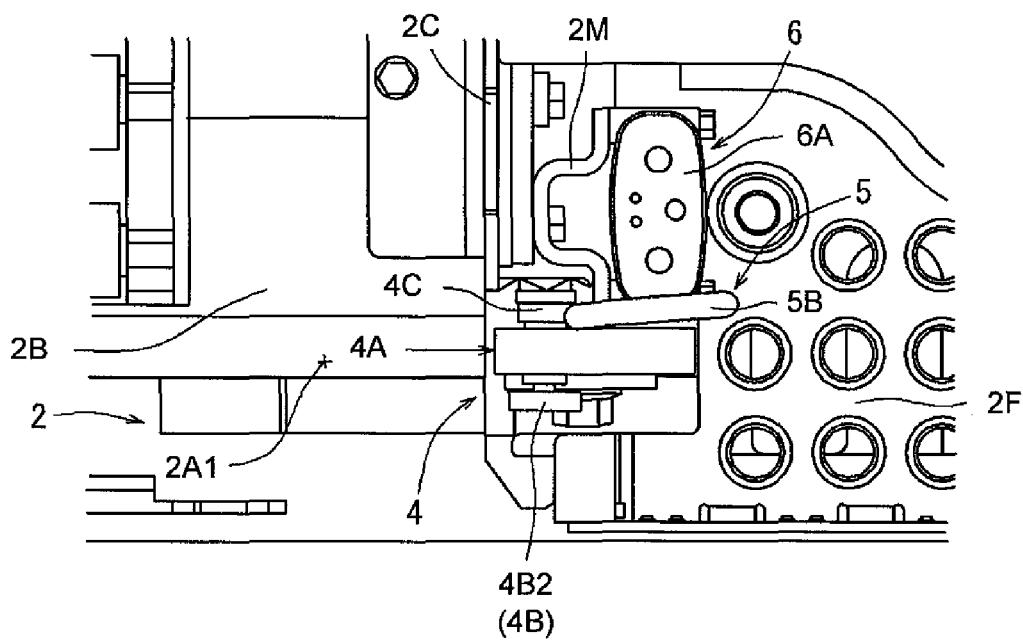
FIG. 6 is a fragmentary top view showing the battery stopper and its related parts, wherein the battery stopper is placed in the open position.

As shown in FIGS. 3 and 5, the stopper body 4A pivoted to the closed position is in contact with a frame stopper 2Q of the vehicle frame 2 and prevented from pivoting on the vehicle frame 2, so that the stopper body 4A is kept substantially in a horizontal position. The distal end 4A2 of the stopper body 4A placed in its closed position projects into the opening 2A1 of the battery compartment 2A and is located substantially at a middle height of the battery unit 3 on the front side thereof. Thus, the battery unit 3 is prevented by the stopper body 4A from sliding out from the battery compartment 2A. As shown in FIGS. 4 and 6, the stopper body 4A pivoted to the open position is located at a position that is forward of the front wall 2C with the proximal end 4A1 positioned at the bottom of the stopper body 4A. Thus, the stopper body 4A is moved away from the opening 2A1 of the battery compartment 2A, thereby allowing the battery unit 3 to be mounted on or removed from the battery compartment 2A through the opening 2A1.

As shown in FIGS. 3 and 5, the battery stopper 4 has a pad 4G and a positioning member 4B for positioning the pad 4C relative to the stopper body 4A. The positioning member 4B has a screw 4B1 and a knob 4B2. The screw 4B1 is screwed through the stopper body 4A at a position adjacent to its distal end 4A2. The knob 4B2 is fixed to the outer end of the screw 4B1. The pad 4C has a cylindrical shape and is mounted to the inner end of the screw 4B1. Rotating the knob 4B2, the screw 4B1 is rotated relative to the stopper body 4A thereby to move the pad 4C toward or away from the battery unit 3.

Therefore, the pad 4C is allowed to come in contact with the battery unit 3 by the positioning member 4B. The battery stopper 4 securely prevents the battery unit 3 from sliding in the battery compartment 2A regardless of the size of the battery unit 3. The pad 4C is made of an elastic material such as polyurethane so as to reduce the noise generated when the battery unit 3 is brought into contact with the pad 4C.

As shown in FIGS. 3 and 4, an anti-connection bar 5 is mounted to the battery stopper 4. The anti-connection bar 5 is provided by a metal bar having a base portion 5A, a preventing portion 5B and an end portion 5C. The base portion 5A has an end which is fixed to the stopper body 4A by welding. The base portion 5A extends from the stopper body 4A in the radial direction of a circle described by any point in the anti-connection bar 5 when the stopper body 4A is pivoted. The anti-connection bar serves as the anti-connection portion or the anti-connection member of the present invention.

As shown in FIGS. 4 and 6, the preventing portion 5B extends from the distal end of the base portion 5A toward the frame connector 6 in perpendicular relation to the base portion 5A. When the battery stopper 4 is in the open position, the preventing portion 5B extends from the distal end of the base portion 5A horizontally toward the front and obliquely inward of the vehicle, as shown in FIG. 6. In this position of the anti-connection bar 5, part of the preventing portion 5B is located above the connection 6A of the frame connector 6, that is, the anti-connection bar 5 is located at its anti-connection position. The anti-connection position is a space where the cable connector 7 is placed while connected to the frame connector 6. Thus, the preventing portion 5B prevents the cable connector 7 from being connected to the frame connector 6. The end portion 5C extends from the distal end of the preventing portion 5B toward the stopper body 4A in perpendicular relation to the preventing portion 5B.

As shown in FIGS. 5 and 6, the anti-connection bar 5 is located between the stopper body 4A and the battery unit 3, and the base portion 5A of the anti-connection bar 5 is mounted to the stopper body 4A at the inner lateral surface 4A3 thereof which faces the battery unit 3. Therefore, when the battery stopper 4 is in the open position, the anti-connection bar 5 is closer to the frame connector 6 than the stopper body 4A. Thus, the anti-connection bar 5 formed with a relatively short length can be located above the frame connector 6.

The following will describe a method of removing the battery unit 3 from the vehicle frame 2. Firstly, the cable connector 7 is removed from the frame connector 6, as shown in FIGS. 3 and 4. Subsequently, the battery stopper 4 is moved from the closed position shown in FIG. 3 to the open position shown in FIG. 4. The battery hood 2E is placed in its pivoted position, as shown in FIG. 2. Then, the battery unit 3 is slid rightward out of the battery compartment 2A through the opening 2A1 by pushing by hand.

If the battery stopper 4 is moved from the closed position toward the open position with the cable connector 7 connected to the frame connector 6, as shown in FIG. 3, the anti-connection bar 5 interferes with the cable connector 7 (refer to FIGS. 3 and 4), so that the battery stopper 4 is prevented from moving to the open position. Therefore, the battery unit 3 cannot be slid relative to the vehicle frame 2. Consequently, with the cable connector 7 connected to the frame connector 6, the battery unit 3 is prevented from being slid relative to the vehicle frame 2. Thus, the power cable 8 is protected from damage.

The following will describe a procedure for mounting the battery unit 3 to the vehicle frame 2. Referring to FIGS. 1 and 2, firstly, the battery unit 3 is inserted into the battery compartment 2A through the opening 2A1. Subsequently, the battery hood 2E is pivoted down to its original position. Then, the battery stopper 4 is pivoted from the open position to the closed position. The pad 4C is adjusted so as to come in contact with the battery unit 3 (refer to FIG. 5). Then, the cable connector 7 is connected to the frame connector 6.

If the cable connector 7 is attempted to be connected to the frame connector 6 with the battery stopper 4 placed in the open position as shown in FIG. 6, such connection is prevented because the anti-connection bar 5 is located above the frame connector 6 or at the anti-connection position. Therefore, the vehicle frame 2 is prevented from running with the battery stopper 4 placed in the open position, so that the battery unit 3 is prevented from being dropped out of the battery compartment 2A during running of the vehicle frame 2.

As described above, the battery stopper 4 is provided with the anti-connection bar 5, as shown in FIGS. 3 and 4. When the battery stopper 4 is in the open position, the anti-connection bar 5 is located at the anti-connection position thereby to prevent the cable connector 7 from being connected to the frame connector 6. When the battery stopper 4 is in the closed position, on the other hand, the anti-connection bar 5 is spaced away from the anti-connection position thereby to allow the cable connector 7 to be connected to the frame connector 6.

Thus, unless the battery stopper 4 is placed in the closed position, the cable connector 7 cannot be connected to the frame connector 6 and, therefore, the forklift truck 1 is prevented from running with the battery stopper 4 placed in the open position. Thus, the battery unit 3 is securely prevented from being dropped out of the battery compartment 2A during running of the forklift truck 1. The anti-connection bar 5 is moved together with the battery stopper 4 because the anti-connection bar 5 is mounted to the battery stopper 4. Located in its anti-connection position, the anti-connection bar 5 prevents the cable connector 7 from being directly connected to the frame connector 6. Therefore, as compared to the conventional structure, prevention of the connection between the frame connector 6 and the cable connector 7 is accomplished by a simple structure.

As shown in FIG. 3, the battery stopper 4 and the anti-connection bar 5 are provided separately and the anti-connection bar 5 is fixed to the battery stopper 4. Therefore, as compared to the case where the battery stopper 4 and the anti-connection bar 5 are provided as a single unit, the battery stopper 4 and the anti-connection bar 5 can be reduced in weight. The battery stopper 4 which is formed by a thick plate so as to restrict the movement of the battery unit 3 and the anti-connection bar 5 formed by a bar can be made light in weight. Since the anti-connection bar 5 is immovably mounted to the battery stopper 4, the anti-connection bar 5 and the battery stopper 4 have a simple structure as compared to the case where the anti-connection bar 5 is movably mounted to the battery stopper 4.

The battery stopper 4 is pivotally mounted to the vehicle frame 2. The anti-connection bar 5 which is pivotable with the battery stopper 4 is movable between the position where the anti-connection bar 5 extends along a side of the battery unit 3 and the position where the anti-connection bar 5 is adjacent to the frame connector 6, as shown in FIGS. 3 and 4. Thus, the battery stopper 4 is mounted to the vehicle frame 2 by a simple structure as compared to the structure where the battery stopper is slidably provided to the vehicle frame. In addition, the anti-connection bar 5 which is located at the position of FIG. 3 does not interfere with the vehicle operator.

The battery stopper 4 has the pad 4C which is adjustably mounted to the stopper body 4A and allowed to come in contact with the battery unit 3 as shown in FIG. 5. The anti-connection bar 5 is mounted to the stopper body 4A at the inner lateral surface 4A3 thereof which faces the battery unit 3. In such an arrangement, the battery stopper 4 securely stops the battery unit 3 from sliding in the battery compartment 2A regardless of the size of the battery unit 3. The anti-connection bar 5 which is located between the stopper body 4A and the battery unit 3, as in the case of the pad 4C, can be located closer to the battery unit 3 than the stopper body 4A. Such an anti-connection bar 5 can be located closer to the frame connector 6 than the stopper body 4A and be made compact.

The anti-connection bar 5 which is thinner than the stopper body 4A, as shown in FIGS. 3 and 4, is easy to be held. In addition, the anti-connection bar 5 is located radially outward of a circle described by any point in the anti-connection bar 5 when the stopper body 4A is pivoted, so that the vehicle operator can easily turn the battery stopper 4 merely by turning the anti-connection bar 5 by hand.

The present invention is not limited to the above-described embodiment, but it may be modified as exemplified below.

Although a battery-powered forklift truck has been described in the above embodiment as the electric vehicle, the present invention is applicable to any other electric vehicles such as battery-powered industrial vehicle or electric automobile. The battery-powered industrial vehicle includes a towing truck and an automatic guided vehicle.

In the above-described embodiment, the battery unit 3 is mounted in and removed from the battery compartment 2A through the opening 2A1 formed on the right side of the vehicle frame 2. However, mounting and removal of the battery unit 3 in and from the battery compartment may be done through an opening formed on the left side of the vehicle frame. Alternatively, mounting and removal of the battery unit 3 in and from the battery compartment may be done through an opening formed on the front or rear side of the vehicle frame.

Although the battery stopper 4 of the above-described embodiment is pivotally mounted to the vehicle frame 2, the battery stopper may be slidably mounted to the vehicle frame.

In the above-described embodiment, the anti-connection bar 5 is immovably mounted to the battery stopper 4. However, the anti-connection bar may be movably mounted to the battery stopper. In this case, an interlock mechanism may be provided so as to move the anti-connection bar relative to the battery stopper in conjunction with movement of the battery stopper to the vehicle frame.

In the above-described embodiment, the connection 6A of the frame connector 6 is faced upward so that the cable connector 7 is connected from above to the frame connector 6. However, the cable connector may be connected to the frame connector from any other directions.

In the above-described embodiment, the battery stopper 4 and the anti-connection bar 5 are provided separately. However, the battery stopper 4 and the anti-connection bar 5 may be provided as a single unit.

The anti-connection bar 5 formed of a round bar in the above-described embodiment may be replaced with an anti-connection bar formed of a plate.

What is claimed is:

1. An electric vehicle comprising:
a vehicle frame;
a frame connector provided on the vehicle frame;
a battery compartment for receiving a battery unit which has a cable connector connected thereto by a power cable, wherein the battery unit is removable from the battery compartment in a horizontal direction, wherein the cable connector is connectable to the frame connector;
a battery stopper formed by a plate, wherein the battery stopper is mounted to the vehicle frame for stopping the battery unit in the battery compartment from removing, wherein the battery stopper is movable between a closed position where the battery unit is stopped from removing and an open position where the battery unit is removable, and the battery stopper, when placed in the closed position, projects into an opening of the battery compartment through which the battery unit enters and exits the battery compartment, to block the battery unit from being removed from the battery compartment through the opening, and the battery stopper has a stopper body, a positioning member and a pad which is adjustably mounted to the stopper body and allowed to come in contact with the battery unit, wherein the positioning member allows the pad to be moved toward or away from the battery unit; and
an anti-connection bar fixed to the stopper body at the inner lateral surface thereof which faces the battery unit and having a base portion, a preventing portion and an end portion, wherein the anti-connection bar is thinner than the stopper body, and located radially outward of a circle formed by any point in the stopper body when the stopper body is pivoted;
wherein when the battery stopper is placed in the open position, the anti-connection bar is located at an anti-connection position thereby to prevent the cable connector from being connected to the frame connector, and
wherein when the battery stopper is placed in the closed position, the anti-connection bar is spaced away from the anti-connection position thereby to allow the cable connector to be connected to the frame connector.

2. The electric vehicle according to claim 1, wherein the anti-connection position is a space where the cable connector is placed while connected to the frame connector.

3. The electric vehicle according to claim 1, wherein the anti-connection bar is not movable into the anti-connection position while the cable connector is connected to the frame connector thereby to prevent the battery unit from being removable.

4. The electric vehicle according to claim 1, wherein when the battery stopper is placed in the closed position, the anti-connection bar is located at an opening of the battery compartment.

5. The electric vehicle according to claim 1, wherein the base portion has an end which is fixed to the stopper body by welding, the base portion extending from the stopper body in the radial direction of a circle described by any point in the anti-connection bar when the stopper body is pivoted, wherein when the battery stopper is placed in the open position, the preventing portion extends from a distal end of the base portion toward the frame connector in perpendicular relation to the base portion.

6. The electric vehicle according to claim 5, wherein when the battery stopper is placed in the open position, the preventing portion of the anti-connection bar extends from the distal end of the base portion horizontally and obliquely toward a position above a connection of the frame connector.

7. The electric vehicle according to claim 1, wherein the battery stopper is pivotable on the vehicle frame, and wherein the anti-connection bar is pivotable between a position where the anti-connection bar extends along a side of the battery unit and the anti-connection position adjacent to the frame connector.

8. The electric vehicle according to claim 1, wherein a connection of the frame connector is faced upward so that the cable connector is connected from above to the frame connector.

* * * * *